United States Patent Office 3,847,939
Patented Nov. 12, 1974

3,847,939
3,5-DICHLOROPHENYLCARBAMYL PYRROLIDINE
Alexander Mihailovski, Berkeley, Calif., assignor to Stauffer Chemical Company, New York, N.Y.
No Drawing. Filed Mar. 13, 1972, Ser. No. 234,334
Int. Cl. C07d 27/02
U.S. Cl. 260—326.4   1 Claim

ABSTRACT OF THE DISCLOSURE

Novel substituted phenyl carbamyl pyrrolidines and pyrrolines are disclosed. The compositions exhibit effective contact and systemic fungicidal activity, and have particular efficacy against bean rust.

SUMMARY OF THE INVENTION

This invention relates to novel compositions of matter and to their use as contact and systemic fungicides. More particularly, the invention relates to compositions of matter having the formula

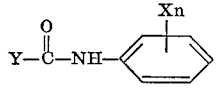

wherein Y is selected from the group consisting of

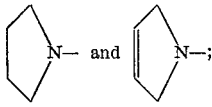

X is selected from the group consisting of chloro, bromo, alkyl containing 1 through 3 carbon atoms, and haloalkyl containing 1 or 2 carbon atoms; and $n$ is 1 through 5, and the use of these materials as contact and systemic fungicides. In a preferred form, the invention relates to compositions of matter having the formula

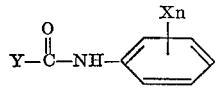

wherein Y is selected from the group consisting of

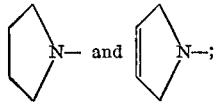

X is selected from the group consisting of chloro, bromo, methyl, ethyl, trichloromethyl, trifluoromethyl, 2,2-dichloroethyl, 2,2-difluoroethyl, and 1,1,2,2,2 - pentafluoroethyl; and $n$ is 1 or 2, and the use of these materials as contact and systemic fungicides. In its most preferred form, the invention relates to compositions of matter having the formula

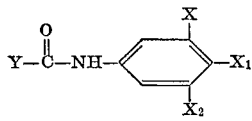

wherein Y is

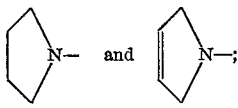

X, $X_1$ and $X_2$ are selected from the group consisting of hydrogen, chloro, bromo, methyl, trichloromethyl, and trifluoromethyl, with the provision that at least one of X, $X_1$, and $X_2$, but not more than one, is hydrogen, and the use of these materials as contact and systemic fungicides.

The compositions are particularly efficacious in controlling bean rust.

In general, the compounds of the invention are produced by reacting the appropriate nitrogen-containing heterocyclic compound with a substituted phenyl isocyanate in solution. Thus, the substituents X, $X_1$, or $X_2$ in the described formula may be varied in compounds produced simply by varying the composition of the substituted phenyl isocyanate employed. In order to illustrate the invention more fully, reference is made to the following examples which demonstrate the preparation of the compounds of the invention:

EXAMPLE 1

N-3,5-Dichlorophenylcarbamylpyrrolidine

To about 8.3 grams (0.12 mole) of pyrrolidine dissolved in 50 milliliters of benzene is added a solution of 21.8 grams (0.12 mole) of 3,5-dichlorophenyl isocyanate in 50 milliliters of benzene. The materials are cooled during addition by use of an ice bath. The resulting mixture is stirred for two hours at room temperature, then filtered, and the isolated solid dried to produce 28.2 grams of N - 3,5 - dichlorophenylcarbamylpyrrolidine having a melting point of 173–175° C. Structure is confirmed by infrared and proton magnetic resonance analysis.

Analysis.—Calc'd for $C_{11}H_{12}Cl_2N_2O$: C, 50.98%; H, 4.67%; N, 10.81%. Found: C, 50.79%; H, 4.47%; N, 10.75%.

EXAMPLE 2

N-3′,5′-Dichlorophenylcarbamyl-3-pyrroline

About 5.0 grams (0.027 mole) of 3,5-dichlorophenyl isocyanate dissolved in 30 milliliters of diethyl ether are added to 1.9 grams (0.027 mole) of 3-pyrroline in 30 milliliters of diethyl ether. The materials are cooled during addition by use of an ice bath. The mixture is stirred for another three hours at room temperature and then filtered. The isolated white solid is washed with diethyl ether and dried to produce about 5.9 grams of N-3′,5′-dichlorophenylcarbamyl - 3 - pyrroline having a melting point of 192–194° C. Structure is confirmed by spectral analysis.

Compounds which may be produced according to the invention include:

1. N-3,5-dichlorophenylcarbamylpyrrolidine
2. N-2′,3′-dichlorophenylcarbamyl-3-pyrroline
3. N-3′-trifluoromethyl-4′-chlorophenylcarbamyl-3-pyrroline
4. N-3′,5′-dichlorophenylcarbamyl-3-pyrroline
5. N-3′-ethylphenylcarbamyl-3-pyrroline
6. N-4-chlorophenylcarbamylpyrrolidine
7. N-4-ethylphenylcarbamylpyrrolidine
8. N-3-chlorophenylcarbamylpyrrolidine
9. N-3,4-dichlorophenylcarbamylpyrrolidine
10. N-4′-chlorophenylcarbamyl-3-pyrroline
11. N-4′-ethylphenylcarbamyl-3-pyrroline
12. N-3′-chlorophenylcarbamyl-3-pyrroline
13. N-3′,4′-dichlorophenylcarbamyl-3-pyrroline
14. N-4-methylphenylcarbamylpyrrolidine
15. N-3-(2′,2′-dichloroethyl)-phenylcarbamylpyrrolidine
16. N-2′-chlorophenylcarbamyl-3-pyrroline
17. N-2,5-dichlorophenylcarbamylpyrrolidine
18. N-4′-methylphenylcarbamyl-3-pyrroline
19. N-3′-(2″,2″-dichloroethyl)-phenylcarbamyl-3-pyrroline
20. N-2′,5′-dichlorophenylcarbamyl-3-pyrroline
21. N-3′-trifluoromethylphenylcarbamyl-3-pyrroline
22. N-3-(2′,2′-difluoroethyl)-phenylcarbamylpyrrolidine 23. N-3-trifluoromethylphenylcarbamylpyrrolidine
24. N-2'-methylphenylcarbamyl-3-pyrroline
25. N-3-fluoromethylphenylcarbamylpyrrolidine
26. N-3'-(2'',2''-difluoroethyl)-phenylcarbamyl-3-pyrroline
27. N-3'-trifluoromethylphenylcarbamyl-3-pyrroline
28. N-2-methylphenylcarbamylpyrrolidine
29. N-3-trifluoromethyl-4-chlorophenylcarbamylpyrrolidine
30. N-3-ethylphenylcarbamylpyrrolidine
31. N-2,3-dichlorophenylcarbamylpyrrolidine
32. N-2-chlorophenylcarbamylpyrrolidine
33. N-3'-(1'',1'',2'',2'',2''-pentafluoroethyl)-phenylcarbamyl-3-pyrroline.

As indicated previously, the compounds of the invention are useful in the control of fungi, particularly bean rust. By control is meant the eradication and/or prevention of fungus or fungi. The compositions of the invention exhibit both contact and systemic activity. In order to demonstrate this activity, the following tests were conducted against bean rust with the compounds numbered 1, 4, 6, 8, 9, 14, 24, and 29.

(Foliar Preventative Test)

The test compounds are dissolved in an appropriate solvent and diluted with water containing several drops of Tween-20, a wetting agent. Test concentrations, ranging from 1000 p.p.m. downward, are sprayed to runoff on the primary leaves of pinto beans (Phaseolus vulgaris L.). After the leaves are dried, they are inoculated with a water suspension of spores of the bean rust fungus (Uromyces phaseoli Arthur) and the plants are placed in an environment of 100% humidity for 24 hours. The plants are then removed from the humidity chamber and held until disease pustules appear on the leaves. Effectiveness is recorded as the lowest concentration, in parts per million, which gives 75 percent or greater control as compared to untreated, inoculated plants. Results of the tests are shown below in Table I.

(Foliar Eradicative Test)

Untreated bean plants are inoculated with spores of the bean rust fungus and placed in an environment with 100% humidity for 24 hours. The plants are then removed from the humidity chamber and held in the greenhouse for two days to allow the disease to become established. The test chemicals are then prepared and applied in the same manner as in the preventative spray test. Eradicative effectiveness is recorded as the lowest concentration, in parts per million, which gives 75 percent or greater control as compared to untreated, inoculated plants. Results of the tests are shown below in Table I.

TABLE I

| Compound number | Preventive spray | Eradicative spray |
| --- | --- | --- |
| 1 | 10 | 25 |
| 4 | 25 | 100 |
| 6 | 100 | >1,000 |
| 8 | 50 | 100 |
| 9 | 100 | >1,000 |
| 14 | 100 | 500 |
| 24 | 50 | 100 |
| 29 | 100 | 500 |

The compounds of the invention are also active systemically, against bean rust, and several are effective systemically against bean powdery mildew. In order to demonstrate systemic fungicidal activity, the following tests were conducted against bean rust with the compounds numbered 1, 4, 6, 8, 9, 14, 24, and 29.

Tube Systemic Test (Bean Rust)

The chemicals are dissolved in an appropriate solvent and diluted with tap water to a series of descending concentrations beginning at 50 parts per million. Sixty milliliters of each cencentration are placed in a test tube. A pinto bean plant is placed in each tube and supported with a piece of cotton so that only the roots and lower stem are in contact with the test solution. Forty-eight hours later the bean leaves are inoculated with a water suspension of spores of the bean rust fungus and placed in an environment with 100% humidity for 24 hours. The plants are then removed from the humidity chamber and maintained in the greenhouse until the disease pustules appear on the leaves. Effectiveness is recorded at the lowest concentration, in p.p.m., which will provide 75% reduction in pustule formation as compared to untreated, inoculated plants. Results of the test are shown in Table II.

Systemic Soil Drench (Bean Rust)

Pinto beans are grown in cartons containing 1 pound of soil. Aliquots of the test chemicals, dissolved in an appropriate solvent, are diluted with 25 milliliters of water and drenched on the soil surface. Two days later the bean leaves are inoculated with a water suspension of spores of the rust fungus, and the plants are placed in an environment with 100% humidity for 24 hours. The plants are then removed from the humidity chamber and maintained in the greenhouse until the pustules appear on the leaves. Effectiveness is recorded as the minimum concentration, in p.p.m. per pound of soil, which will provide 75% reduction in number of pustules as compared to untreated, inoculated plants. Results of the test are shown in Table II.

TABLE II

| Compound number | Tube systemic | Soil drench |
| --- | --- | --- |
| 1 | 1 | 1.5 |
| 4 | 25 | |
| 6 | 5 | 13 |
| 8 | 5 | 6 |
| 9 | 1 | 27 |
| 14 | 5 | 5 |
| 24 | 25 | |
| 29 | 5 | 27 |

As can be seen by the test results, the compositions of the invention may be used as contact and systemic fungicides. The compositions may be applied directly to the particular plant or plants to be protected, or may be applied generally to a locus to be protected, e.g., as a soil drench. In either event, it is of course necessary that the unwanted fungi receive an effective or controlling dosage or amount, i.e., an amount sufficient to kill, prevent, or retard growth.

The compositions are normally employed with a suitable carrier and may be applied as a dust, spray, drench or aerosol. The compositions thus may be applied in combination with solvents, diluents, various surface active agents (for example detergents, soaps or other emulsifying or wetting agents, surface active clays) carrier media, adhesives, spreading agents, humectants and the like. They may also be combined with other biologically active compositions, including other fungicides, bactericides, and algaecides, insecticides, growth stimulators, acaricides, herbicides, molluscicides, etc., as well as with fertilizers, soil modifiers, etc. The compositions of the invention may be used in combination with an inert carrier and a surface active or emulsifying agent, and may also be applied in combination with other biologically active materials, in conjunction with a carrier and a surface active or emulsifying agent. The solid and liquid formulations can be prepared by any of the conventional methods well-known by those skilled in the art. Since the amount of active agent required will vary according to the biological organism treated and plant system, precise limits on the amounts employed cannot be given. Determination of the optimum effective concentrations for a specific application is readily conducted by routine procedures, as will be apparent to those skilled in the art. As indicated, the amount applied in a given case will be an effective amount, i.e., a controlling amount.

Various changes and modifications may be made without departing from the spirit and the scope of the invention described herein, as will be apparent to those skilled in the art to which it pertains.

What is claimed is:

1. 3,5-dichlorophenylcarbamylpyrrolidine.

References Cited

Beaver et al., *Chem. Abs.*, vol. 51, 11269h abs. of *J. Am. Chem. Soc.* 79, 1236–45 (1957).

Evans, *Chem. Abs.*, vol. 47, 562–563e abs. of *J. Am. Chem. Soc. 73*, 5230–4 (1953).

JOSEPH A. NARCAVAGE, Primary Examiner

U.S. Cl. X.R.

424—274